Patented Dec. 21, 1937

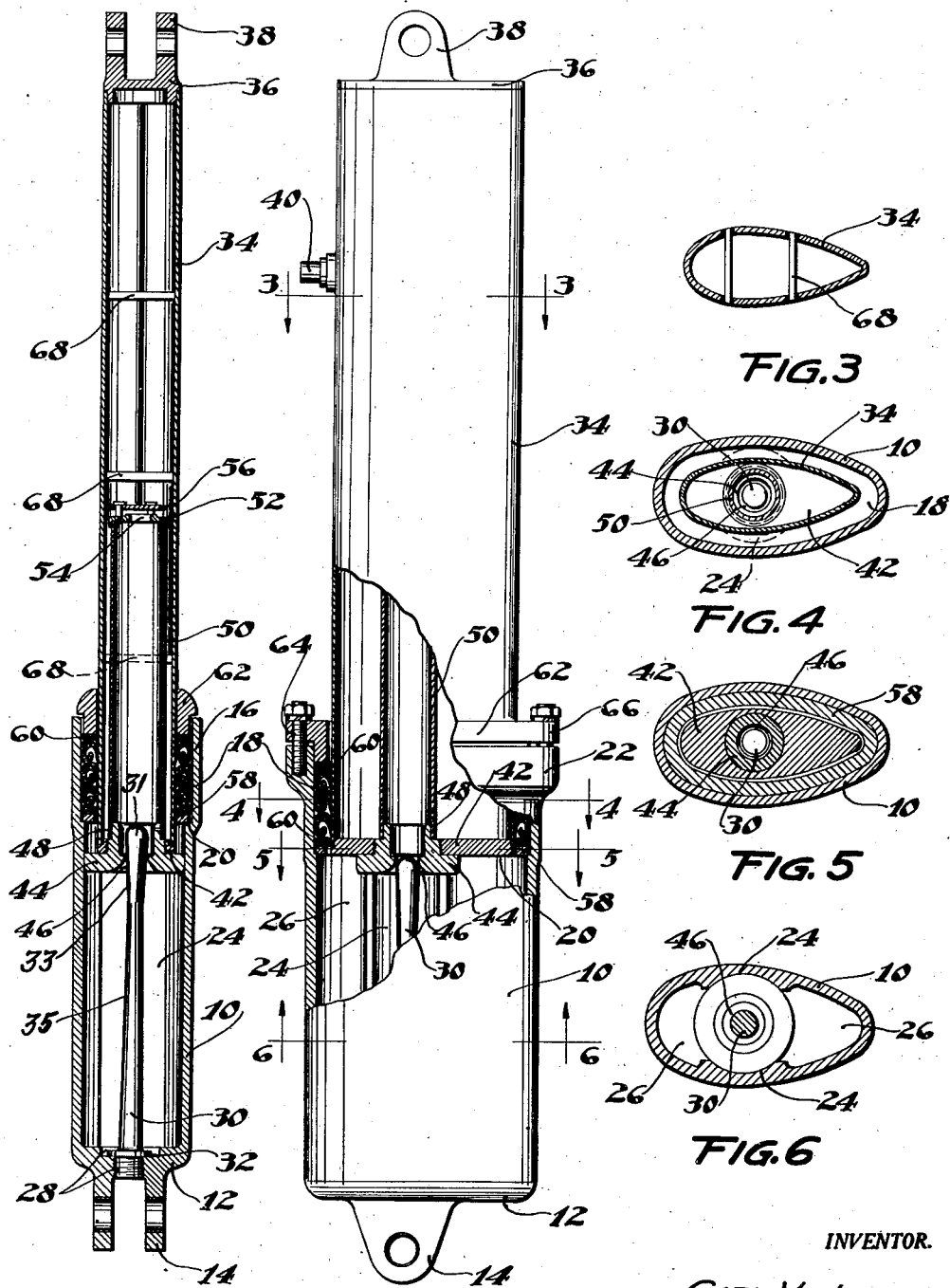

2,102,847

UNITED STATES PATENT OFFICE 2,102,847

SHOCK ABSORBER STRUT

Carl V. Johnson, South Bend, Ind., assignor to Bendix Research Corporation, South Bend, Ind., a corporation of Indiana Application March 7, 1931, Serial No. 520,778

15 Claims. (Cl. 267—64)

This invention relates to shock absorbers and more particularly to shock absorbing struts for aircraft.

Broadly, the invention comprehends a shock absorbing strut of the pneumatic hydraulic type, including telescopic streamlined cylinders, one of which carries a piston for reciprocation in the other, the structure being such that the necessity of providing separate fairings to reduce resistance is avoided.

An object of the invention is to provide a shock absorbing strut having a streamline shape of a fineness ratio.

Another object of the invention is to provide a shock absorbing strut of the pneumatic hydraulic type having a streamline shape.

Another object of the invention is to provide a shock absorbing strut comprising telescopic streamlined cylinders.

Another object of the invention is to provide a shock absorbing strut of the pneumatic hydraulic type having a streamlined cylinder with guideways for a piston and substantial clearance between the piston and the wall of the cylinder.

Another object of the invention is to provide a shock absorbing strut of the pneumatic hydraulic type comprising telescopic cylinders of streamline shape constructed and assembled in an exceedingly cheap and simple manner.

A further object of the invention is to provide a shock absorbing strut of streamline shape in which the amount of required machine operations on the various parts during manufacture may be materially reduced.

Other objects of the invention will appear from the following description taken in connection with the drawing, which forms a part of this specification, and in which:

Figure 1 is a vertical sectional view of a shock strut partly collapsed, illustrating the invention as applied;

Figure 2 is a side elevation of the strut completely extended and partly broken away;

Figure 3 is a cross sectional view substantially on line 3—3, Figure 2;

Figure 4 is a cross sectional view substantially on line 4—4, Figure 2;

Figure 5 is a cross sectional view substantially on line 5—5, Figure 2; and

Figure 6 is a cross sectional view substantially on line 6—6, Figure 2.

Referring to the drawing for more specific details of the invention, 10 represents a tubular member or cylinder having a streamline shape of a given fineness ratio. It is, of course, understood that any other fineness ratio could be used as well as the simple oval shown with equally beneficial results.

The cylinder 10 is closed at one end as at 12 and provided with a clevis 14 for attaching the axle of an airplane. The other end of the cylinder is enlarged as at 16 to provide a suitable packing chamber 18 having formed therein a shoulder 20 and exterior bosses 22 arranged in oppositely disposed relation, the object of which will hereinafter appear.

Arranged within the chamber 10 are oppositely disposed guideways 24. As shown, the guideways are arcuate in cross section and are positioned in the circumference of a circle, the center of which is common to both arcs. This arrangement provides opposed spaces 26 and this is particularly desirable because it eliminates the necessity of using special equipment for finishing the cylinder, since only a true circular section needs to be finished. Such operations may be accomplished with ordinary boring, grinding or reaming tools, thus avoiding costly broaching or other operations necessary to finish the streamline of the cylinder.

The closed end 12 of the cylinder 10 has a double diameter bore 28 concentric with the arcuate guideways 24 and a metering pin 30 having a circumferential flange 32 is threaded in the small bore with the flange seated in the larger bore. This particular means of mounting the metering pin lends strength and rigidity thereto because of the added support given to the pin by the flange. The metering pin 30 is preferably provided as shown with a rounded head portion 31, a tapered portion 33, connected thereto, gradually diminishing in diameter toward the central portion of the pin, and a second tapered portion 35 gradually increasing in diameter from the central portion to the base thereof.

Positioned for reciprocation in the streamlined cylinder 10 is a streamlined cylinder 34. This cylinder is closed at one end by a cap 36 provided with a clevis 38 for attaching the fuselage of an airplane. It is further provided with a suitable filling valve 40 and has secured in its other end a cylinder comprising plate 42 supporting a piston member 44 adaptable for reciprocation on the guideways 24.

The piston 44 is provided with a metering orifice 46 for the reciprocation of the metering pin 30, and suitably secured by one end to a skirt 48 on the piston is an inner-cylindrical chamber 50 having a vent adjacent the skirt of the piston, the other end of which chamber has secured thereto a cap 52 provided with an orifice 54 controlled by a flap valve 56 carried by the cap.

The streamlined cylinders 10 and 34 are held together by a retaining ring 58 positioned on the shoulder 20 in the packing chamber 18 and secured in place as by packing lips 60 interposed between the retaining ring and a slip ring 62 fitted in the open end of the packing chamber and secured in position as by stud bolts 64 passing through ears 66 on the slip ring and threaded into the bosses 22 on the packing chamber.

It is to be observed that the overall diameter of the piston 44 is greater than the smallest diameter of the elliptical plate 42, hence the piston abuts the retaining ring 58 when the strut is in a fully extended position. It is also to be observed that there is sufficient clearance between the perimeter of the plate 42 and the inner perimeter of the retaining ring 58 to provide free passage of a hydraulic fluid to the packing chamber so that the packing lips may be retained under pressure.

It has been found that a shock strut of a streamline shape may show a tendency, due to internal pressure, to distort the streamline shape. To overcome this contingency the lower cylinder may be made relatively heavy, since it is cast or forged and the upper cylinder may be reinforced as by spaced transverse rods or tubes 68 or other suitable reinforcing means.

In operation, the strut is filled through the valve 40 with a suitable hydraulic fluid and with gas under pressure above the liquid. Assuming that the strut has been filled, then on the compression stroke the fluid contained in the lower cylinder is forced through the metering orifice 46 in the piston 44 past the metering pin 30 into the inner-cylinder 50, from whence it passes through the flap valve in the upper end of the inner-chamber into cylinder 34 against the pressure of the gas contained therein. During the beginning of the compression stroke above referred to, the rounded head portion 31 produces a quick closing of the orifice 46, see Fig. 2, thereby at the outset producing a substantial initial resistance to relative movement. Since the landing gear is provided with a wheel having a resilient or pneumatic tire, the latter will be compressed during this stage of substantial resistance. Thereafter for a portion of the stroke, the orifice is gradually opened due to the upper taper 33, and the resistance may be substantially maintained since the rate of relative movement of the parts is gradually increasing through this portion of the stroke. Thereafter, the moving parts are gradually brought to rest by reason of the provision of the lower tapered portion 35 which gradually closes the orifice 46. This combined resistance offered by the flow of the liquid through the orifice and the compression of the gas above the piston produces the work curve desired.

On the compression stroke the liquid passes through the flap valve into the chamber 34 and on the return stroke the flap valve closes, due to the pressure of the compressed gas, thus forcing the liquid to return from the cylinder 34 through suitable openings or vents into the inner-cylinder 50 from whence it passes through the metering orifice in the piston 44 to the cylinder 10.

It will thus appear that a novel streamline shock strut construction has been devised and that the telescopic streamline chambers will be under the least possible stress tending to distort them since the strut combined with the metering pin as described may be subjected to a minimum but constant load during shock rather than to a peak load which although rapidly falling off would necessarily tend to distort the non-circular casings.

Although this invention has been described in connection with certain specific embodiments, the principles involved are susceptible of numerous other applications that will readily occur to a person skilled in the art. The invention is, therefore, to be limited only as indicated by the scope of the appended claims.

Having thus described the various features of the invention, what I claim as new and desire to secure by Letters Patent is:

1. A shock absorbing strut comprising a streamlined cylinder having guiding surfaces arranged in arcs, the centers of which are common to both surfaces, a circular piston arranged to reciprocate within and be guided by said guiding surfaces, and a second stream line cylinder having a cross section whose minor axis is less than and whose major axis is greater than the diameter of said piston, said second cylinder being secured to said piston and adapted to reciprocated within the first named stream lined cylinder.

2. A shock absorbing strut comprising a streamlined cylinder, oppositely disposed guide surfaces therein arranged in arcs, the centers of which are common to both surfaces, a metering pin in the cylinder having its axis coincident with the axis of the arcuate guide surfaces, and an orificed circular piston adapted to reciprocate within said guides and cooperate with said metering pin, said piston carrying thereon a second stream lined cylinder of lesser cross section than said first cylinder, said second cylinder being closed at the piston end except for said orifice.

3. A shock absorbing strut comprising a streamlined cylinder, oppositely arranged guides in the cylinder, a second cylinder positioned for reciprocation in the first cylinder, a piston carried by the second cylinder and movable on the guides and a retaining ring on the first cylinder embracing the second cylinder and engaging the piston when the strut is fully extended.

4. A shock absorbing strut comprising a streamlined cylinder, guides arranged therein in oppositely disposed relation, a second streamlined cylinder positioned for reciprocation in the first cylinder, a piston carried by the second cylinder movable on the guideways to support and direct the second cylinder and a retaining ring in the first cylinder embracing the second cylinder and adapted to engage the piston when the strut is fully extended.

5. A shock absorbing strut comprising a streamlined cylinder, guides therein arranged in oppositely disposed relation, a metering pin in the cylinder concentric to the guides, a second streamlined cylinder positioned for reciprocation in the first streamlined cylinder, a piston carried by the second cylinder movable on the guides, a metering orifice in the piston receiving the pin and a retaining ring on the first cylinder embracing the second cylinder and adapted to engage the piston when the strut is fully extended.

6. A shock absorbing strut comprising a streamlined cylinder, guides therein arranged in oppositely disposed relation, a second streamlined cylinder positioned for reciprocation in the first cylinder, a piston carried by the second cylinder movable on the guides, a metering orifice in the piston and a retaining ring on the first cylinder embracing the second cylinder and adapted to engage the piston when the strut is fully extended.

7. A shock absorbing strut comprising a streamlined cylinder, guides therein arranged in oppositely disposed relation, a metering pin in the cylinder concentric to the guides, a second streamlined cylinder positioned for reciprocation in the first cylinder, a piston carried by the chamber movable on the guides, an inner chamber supported by the piston, a valve in the inner chamber, a metering orifice in the piston communicating with the inner chamber and receiving the metering pin and a retaining ring on the first cylinder embracing the second cylinder and adapted to engage the piston when the strut is in fully extended position.

8. A shock absorbing strut comprising a cylinder closed at one end and having a stream line cross section and arcuate guiding surfaces arranged therein, a circular piston having a central orifice arranged to reciprocate within and be guided by said guiding surfaces, a second stream line cylinder having a section whose minor axis is less than and whose major axis is greater than the diameter of said piston, said second cylinder being secured to said piston and adapted to reciprocate within the first named stream lined cylinder, and a metering pin secured to the end closure adapted to cooperate with said orifice.

9. A shock strut comprising telescopic casings, a piston secured to the end of one and adapted to reciprocate in the other, a circular bushing immovably secured in said piston having a central orifice, said bushing extending through said piston and having a flange seating thereon, a metering pin carried in the other casing adapted to cooperate with said orifice, and a metering pin housing secured on said bushing.

10. In a shock strut a piston, a central aperture therein, a bushing having a central orifice secured in said aperture, said bushing having a flange on one end seated against the piston and a tubular member, having a flap valve at one end, secured to said bushing at its other end.

11. In a shock strut comprising telescopic casings, a piston, an aperture therein, an orifice bushing having a flange on one end, secured on and extending through said aperture, and a tubular member secured to the through end of said bushing spaced from said casings, said tubular member having a flap valve and at least one bleed port therein.

12. In a shock strut a piston of stream line contour, an aperture therein, an orifice bushing having a circular flange on one end extending beyond the minor axis of said piston, said bushing being seated in said aperture and extending therethrough, and a tubular housing having a flap valve in one end secured to said bushing on its through end.

13. In a shock strut a piston of stream line contour, an aperture therein, and an orifice bushing having a circular flange on one end extending beyond the minor axis of said piston, said bushing being seated in said aperture.

14. In a shock strut having a restricted orifice through which fluid is forced, a pair of telescopic casings of streamline cross section, means for forcing fluid through the orifice, a metering pin cooperating therewith having a varying cross sectional area so correlated to the velocity of said first mentioned means that substantially constant resistance is maintained throughout substantially the entire stroke of the first mentioned means, whereby pressures tending to distort the casings of streamlined cross section will be kept at a constant minimum.

15. A shock strut comprising telescopic casings, at least one of which is streamlined in cross section, a restricted orifice therein, means for forcing fluid through said orifice and means controlling the effective area of the orifice so that substantially constant resistance is developed throughout practically the entire stroke of the strut, whereby fluid pressures within the strut tending to distort the streamline section may be kept at a substantially minimum constant value.

CARL V. JOHNSON.